US011474760B2

(12) United States Patent
Chida

(10) Patent No.: US 11,474,760 B2
(45) Date of Patent: Oct. 18, 2022

(54) INFORMATION PROCESSING SYSTEM, SERVER, AND INFORMATION PROCESSING METHOD WHICH PRINTS USING GUEST ACCOUNT INFORMATION

(71) Applicant: Susumu Chida, Kanagawa (JP)

(72) Inventor: Susumu Chida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/406,093

(22) Filed: Aug. 19, 2021

(65) Prior Publication Data

US 2022/0107767 A1    Apr. 7, 2022

(30) Foreign Application Priority Data

Oct. 1, 2020   (JP) .............................. JP2020-167089

(51) Int. Cl.
   *G06F 3/12*   (2006.01)
(52) U.S. Cl.
   CPC ............ *G06F 3/1238* (2013.01); *G06F 3/121* (2013.01); *G06F 3/1222* (2013.01); *G06F 3/1239* (2013.01); *G06F 3/1286* (2013.01)
(58) Field of Classification Search
   None
   See application file for complete search history.

(56) References Cited

U.S. PATENT DOCUMENTS

| 2006/0001897 A1* | 1/2006 | Ogasawara | H04N 1/444 |
| | | | 358/1.13 |
| 2011/0218892 A1* | 9/2011 | Jeong | G06Q 40/12 |
| | | | 705/30 |
| 2022/0078307 A1* | 3/2022 | Muto | H04N 1/32117 |

FOREIGN PATENT DOCUMENTS

| JP | 2012-248002 | 12/2012 |
| JP | 2015-001787 | 1/2015 |

* cited by examiner

*Primary Examiner* — Thomas D Lee
(74) *Attorney, Agent, or Firm* — Xsensus LLP

(57) ABSTRACT

An information processing system includes a print server with first circuitry and a memory and a printing apparatus with second circuitry. The first circuitry generates guest account information including a user ID of a guest terminal, an available print count, and an apparatus ID of the printing apparatus, and receives a print file from the terminal. The memory stores the account information and the print file. The second circuitry receives authentication information from the terminal, acquires the account information and the corresponding print file from the server based on the user ID and the apparatus ID, controls execution of printing with the acquired print file, updates the print count in the acquired account information based on the printing, and transmits the updated print count to the server. Based on the updated print count, the first circuitry updates the print count in the stored account information of the terminal.

7 Claims, 13 Drawing Sheets

INFORMATION PROCESSING SYSTEM, SERVER, AND INFORMATION PROCESSING METHOD WHICH PRINTS USING GUEST ACCOUNT INFORMATION

CROSS-REFERENCE TO RELATED APPLICATION

This patent application is based on and claims priority pursuant to 35 U.S.C. § 119(a) to Japanese Patent Application No. 2020-167089, filed on Oct. 1, 2020, in the Japan Patent Office, the entire disclosure of which is hereby incorporated by reference herein.

BACKGROUND

Technical Field

The present invention relates to an information processing system, a server, and an information processing method.

Description of the Related Art

With movements to change the work culture such as "work style reform" promoted by the Japanese government, there has been an increasing number of workers not bound to a particular workplace or environment.

Typical work facilities, however, have not yet been well-equipped to adjust to such work style changes. In some facilities, a user is unable to use equipment such as a multifunction peripheral/product/printer (MFP, an example of a printing apparatus) unless certain environment settings are made for an information processing terminal of the user (an example of a guest information processing terminal). For example, there is a guest wireless fidelity (Wi-Fi, registered trademark) generator that provides a network for guest users but does not take printing into consideration. For a user to execute a print function of the MFP, therefore, the driver for the MFP should be installed in the guest information processing terminal.

SUMMARY

In one embodiment of this invention, there is provided an information processing system that includes, for example, a printing apparatus and a print server. The print server includes first circuitry and a memory. The first circuitry generates guest account information in accordance with an account creation request from the printing apparatus. The guest account information includes a user identifier for identifying a user of a guest information processing terminal, an available print count representing the number of times allowed to execute printing with the printing apparatus, and an apparatus identifier for identifying the printing apparatus. The first circuitry further receives a print file from the guest information processing terminal. The memory stores the guest account information and the print file. The printing apparatus includes second circuitry. The second circuitry receives, from the guest information processing terminal, authentication information for executing the printing, acquires the guest account information and the print file corresponding to the guest account information from the print server based on the apparatus identifier and the user identifier of the user of the guest information processing terminal authenticated with the authentication information, controls execution of the printing in accordance with the acquired print file, updates the available print count in the acquired guest account information based on a result of executing the printing, and transmits the updated available print count to the print server. Based on the updated available print count received from the printing apparatus, the first circuitry of the print server updates the available print count in the guest account information of the guest information processing terminal having executed the printing among one or more sets of guest account information stored in the memory.

In one embodiment of this invention, there is provided a server that includes, for example, circuitry and a memory. The circuitry generates guest account information in accordance with an account creation request from a printing apparatus. The guest account information includes a user identifier for identifying a user of a guest information processing terminal, an available print count representing number of times allowed to execute printing with the printing apparatus, and an apparatus identifier for identifying the printing apparatus. The circuitry further receives a print file from the guest information processing terminal. The memory stores the guest account information and the print file. The circuitry acquires the guest account information and the print file corresponding to the guest account information from the memory based on the apparatus identifier and the user identifier of the user of the guest information processing terminal, both of which have been received from the printing apparatus, transmits the acquired print file to the printing apparatus, receives from the printing apparatus an updated available print count resulting from updating the available print count based on a result of executing the printing, and updates, based on the updated available print count received from the printing apparatus, the available print count in the guest account information of the guest information processing terminal having executed the printing among one or more sets of guest account information stored in the memory.

In one embodiment of this invention, there is provided an information processing method that includes, for example, generating guest account information in accordance with an account creation request from a printing apparatus. The guest account information includes a user identifier for identifying a user of a guest information processing terminal, an available print count representing number of times allowed to execute printing with the printing apparatus, and an apparatus identifier for identifying the printing apparatus. The information processing method further includes receiving a print file from the guest information processing terminal, storing the guest account information and the print file in a memory, acquiring the guest account information and the print file corresponding to the guest account information from the memory based on the apparatus identifier and the user identifier of the user of the guest information processing terminal, both of which have been received from the printing apparatus, transmitting the acquired print file to the printing apparatus, receiving from the printing apparatus an updated available print count resulting from updating the available print count based on a result of executing the printing, and updating, based on the updated available print count received from the printing apparatus, the available print count in the guest account information of the guest information processing terminal having executed the printing among one or more sets of guest account information stored in the memory.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
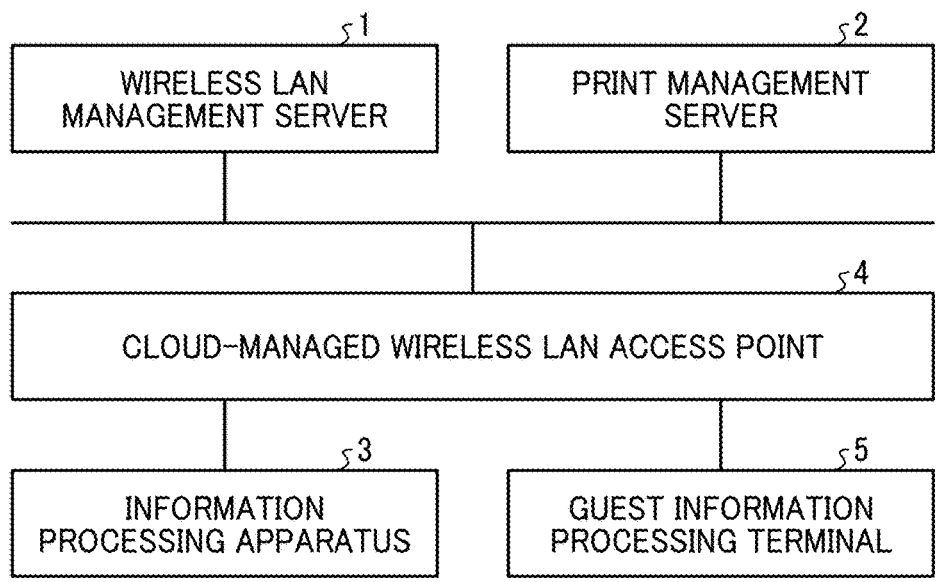
FIG. 1 is a diagram illustrating an example of the network configuration of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An information processing system according to an embodiment of the present invention will be described in detail below with reference to the accompanying drawings.

An example of the network configuration of the information processing system of the embodiment will first be described with FIGS. 1 and 2.

Figure 2:
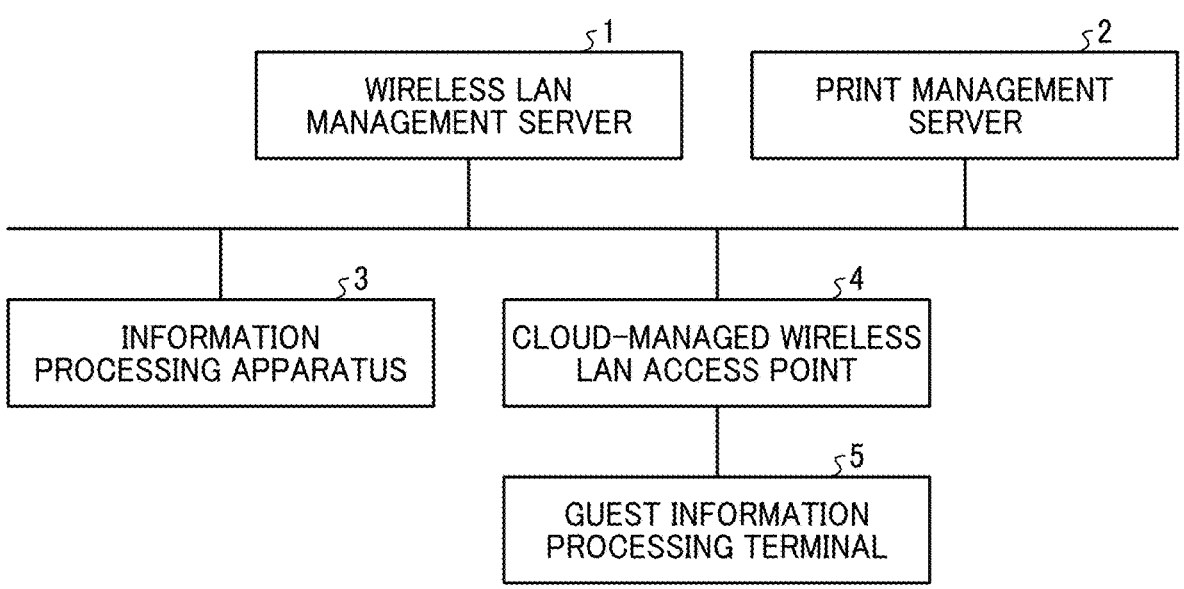
FIG. 2 is a diagram illustrating another example of the network configuration of the information processing system of the embodiment.

FIGS. 1 and 2 are diagrams each illustrating an example of the network configuration of the information processing system of the embodiment. As illustrated in FIGS. 1 and 2, an information processing system 100 of the embodiment includes a wireless local area network (LAN) management server 1, a print management server 2, an information processing apparatus 3, a cloud-managed wireless LAN access point 4, and a guest information processing terminal 5 used by a guest user. The wireless LAN management server 1 is an example of a wireless communication management server. The print management server 2 is an example of a print server. The information processing apparatus 3 is an example of a printing apparatus, and may be a multifunction peripheral/product/printer (MFP), for example.

In FIG. 1, the information processing apparatus 3 is connected to a network such as the Internet via the cloud-managed wireless LAN access point 4 to be communicable with the wireless LAN management server 1 and the print management server 2. The network configuration of the information processing system 100, however, is not limited thereto. As illustrated in FIG. 2, the information processing apparatus 3 may be connected to a network such as the Internet not via the cloud-managed wireless LAN access point 4 to be communicable with the wireless LAN management server 1 and the print management server 2.

The cloud-managed wireless LAN access point 4 is a device connected to the information processing apparatus 3 or the guest information processing terminal 5, for example, to relay communication between the information processing apparatus 3 or the guest information processing terminal 5 and the wireless LAN management server 1 or the print management server 2, for example. The wireless LAN management server 1 controls the cloud-managed wireless LAN access point 4 to enable or disable a guest network for connecting the guest information processing terminal 5, the print management server 2, and the information processing apparatus 3 to each other.

The print management server 2 is an example of a print server that generates guest account information according to an account creation request from the information processing apparatus 3, receives a print file from the guest information processing terminal 5, and manages (e.g., stores and deletes) the guest account information and the print file, for example. The guest account information includes a user identifier (ID) of a user of the guest information processing terminal 5, an available print count representing the number of times allowed to use a print function of the information processing apparatus 3, and an information processing apparatus ID of the information processing apparatus 3 (an example of an apparatus ID), for example. The information processing apparatus ID is information uniquely identifying the information processing apparatus 3. It is assumed here that the information processing apparatus ID is previously transmitted to the print management server 2 from the information processing apparatus 3 when the information processing apparatus 3 and the print management server 2 become communicable with each other. The print file is information that is printed with the print function of the information processing apparatus 3.

The information processing apparatus 3 is an example of a printing apparatus with a print function, such as an MFP. The information processing apparatus 3 transmits the account creation request to the print management server 2. The information processing apparatus 3 also transmits a print file acquisition request and a deletion request to the print management server 2. The information processing apparatus 3 further requests the wireless LAN management server 1 to enable or disable the guest network.

An example of the hardware configuration of the print management server 2 of the embodiment will be described with FIG. 3. Although the following description is of an exemplary hardware configuration of the print management server 2, the wireless LAN management server 1 also has a hardware configuration similar to that of the print management server 2.

Figure 3:
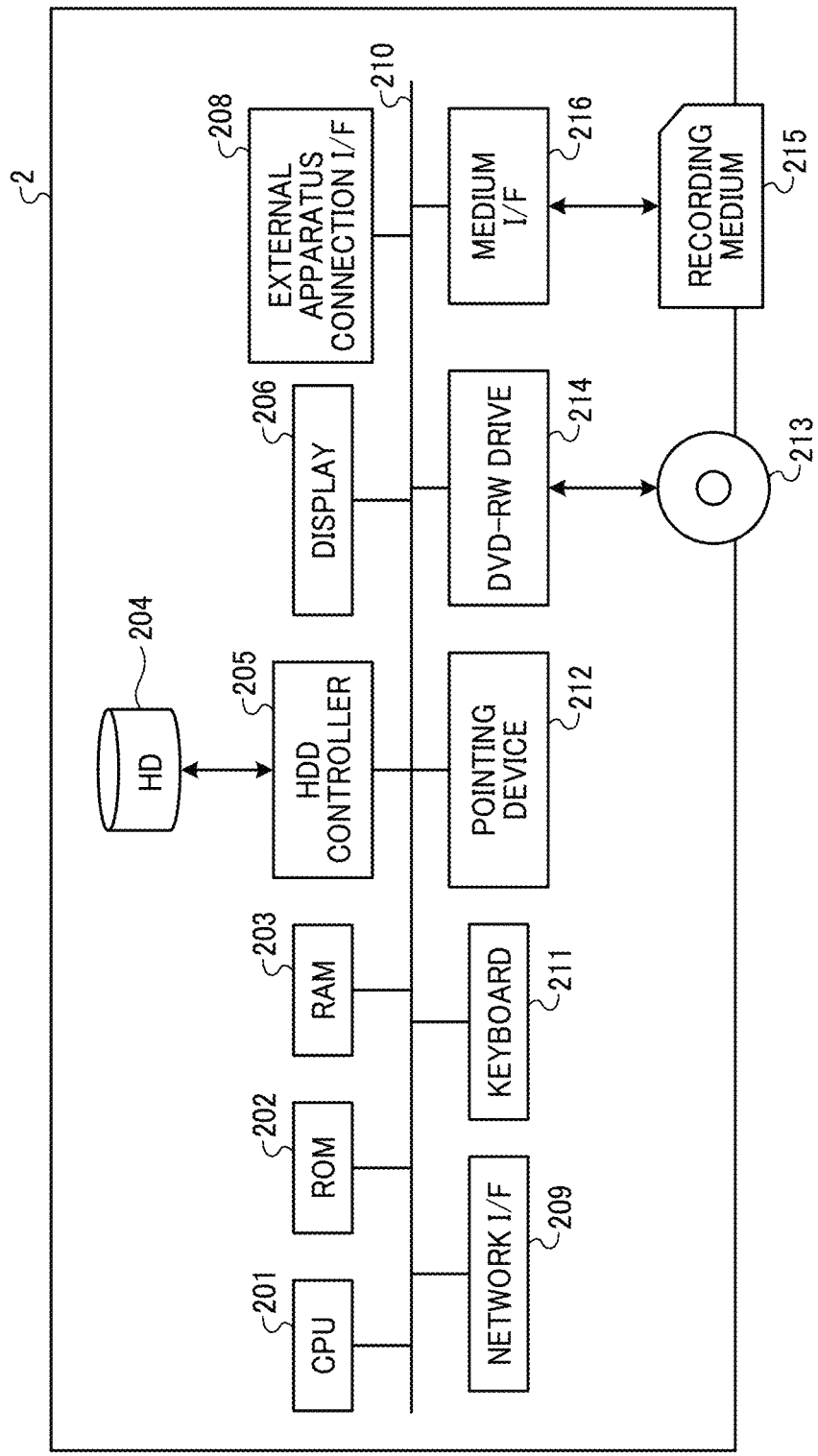
FIG. 3 is a diagram illustrating an example of the hardware configuration of a print management server included in the information processing system of the embodiment.

FIG. 3 is a diagram illustrating an example of the hardware configuration of the print management server 2 included in the information processing system 100 of the embodiment. As illustrated in FIG. 3, the print management server 2 is implemented by a computer, and includes a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a bus line 210, a keyboard 211, a pointing device 212, a digital versatile disk-rewritable (DVD-RW) drive 214, and a medium I/F 216.

The CPU 201 controls the overall operation of the print management server 2. The ROM 202 stores a program used to drive the CPU 201, such as an initial program loader (IPL). The RAM 203 is used as a work area for the CPU 201. The HD 204 stores various data of programs, for example. The HDD controller 205 controls writing and reading of various data to and from the HD 204 under the control of the CPU 201. The display 206 displays various information such as a cursor, menus, windows, text, and images. The external apparatus connection I/F 208 is an interface for connecting the print management server 2 to various external apparatuses. The external apparatuses in this case include a universal serial bus (USB) memory and a printer, for example. The network I/F 209 is an interface for performing data communication via a communication network. The bus line 210 includes an address bus and a data bus for electrically connecting the CPU 201 and the other components in FIG. 3 to each other.

The keyboard 211 is an input device including a plurality of keys for inputting text, numerical values, and various instructions, for example. The pointing device 212 is an input device used to select and execute various instructions, select a processing target, and move the cursor, for example. The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium I/F 216 controls writing (i.e., storage) and reading of data to and from a recording medium 215 such as a flash memory.

A description will be given of an example of the hardware configuration of the information processing apparatus 3 of the embodiment. The following description will be given of an MFP as an example of the information processing apparatus 3 of the embodiment.

Figure 4:
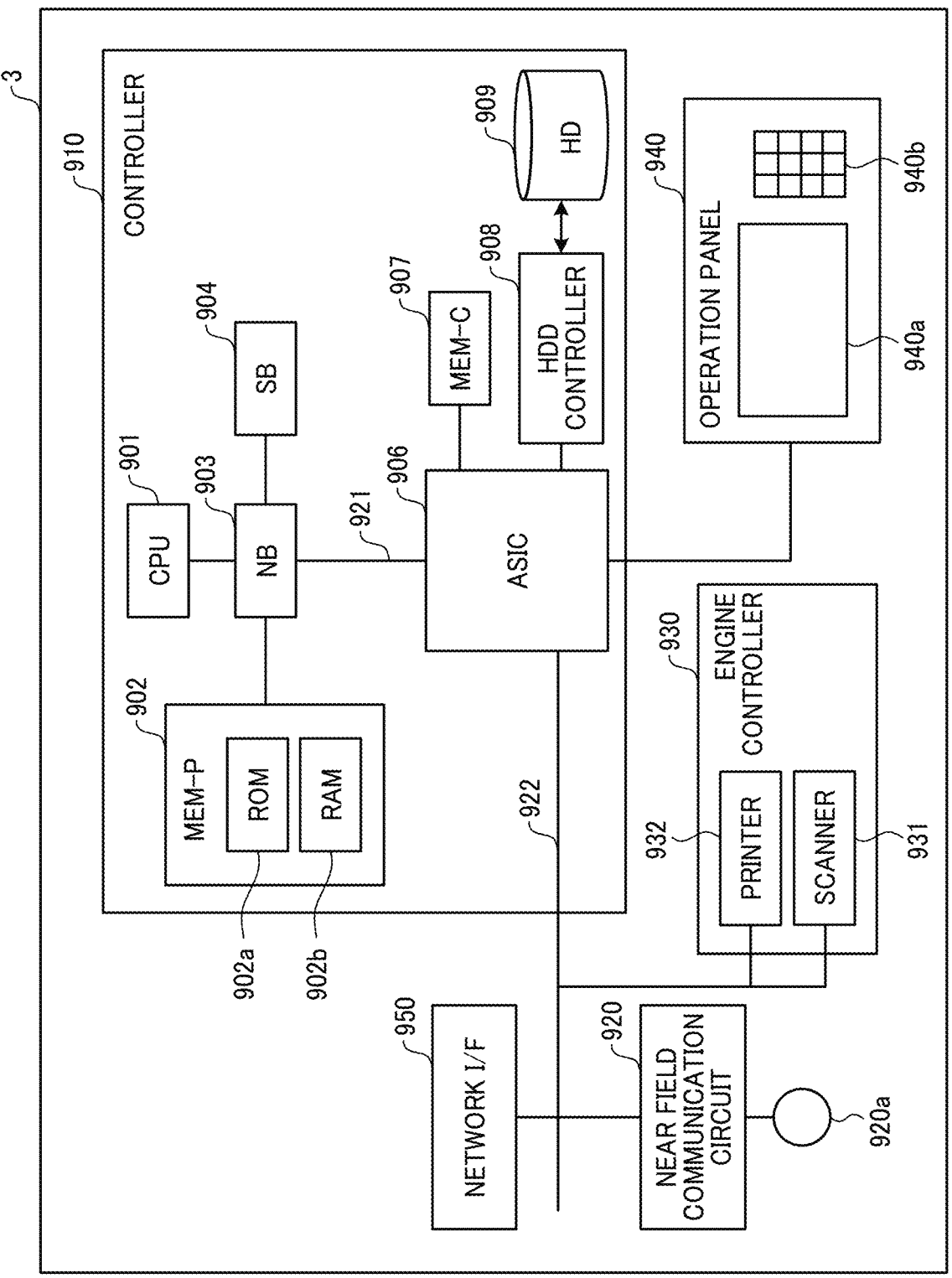
FIG. 4 is a diagram illustrating an example of the hardware configuration of an information processing apparatus included in the information processing system of the embodiment.

FIG. 4 is a diagram illustrating an example of the hardware configuration of the information processing apparatus 3 included in the information processing system 100 of the embodiment. As illustrated in FIG. 4, the MFP as an example of the information processing apparatus 3 includes a controller 910, a near field communication circuit 920, an engine controller 930, an operation panel 940, and a network I/F 950.

The controller 910 includes a CPU 901 as a major unit of a computer forming the information processing apparatus 3, a system memory (MEM-P) 902, a north bridge (NB) 903, a south bridge (SB) 904, an application specific integrated circuit (ASIC) 906, a local memory (MEM-C) 907 serving as a storage unit, an HDD controller 908, and an HD 909 serving as a storage unit. The NB 903 and the ASIC 906 are connected to each other by an accelerated graphics port (AGP) bus 921.

The CPU 901 is a control device that performs the overall control of the information processing apparatus 3 (i.e., the MFP). The NB 903 is s bridge for connecting the CPU 901, the MEM-P 902, the SB 904, and the AGP bus 921 to each other. The NB 903 includes a memory controller for controlling data writing and reading to and from the MEM-P 902, a peripheral component interconnect (PCI) master, and an AGP target.

The MEM-P 902 includes a ROM 902*a* and a RAM 902*b*. The ROM 902*a* is a memory for storing programs and data for implementing the functions of the controller 910. The RAM 902*b* is used as a memory in deploying a program or data or as a rendering memory in memory printing, for example. Each of the programs stored in the ROM 902*a* may be provided as recorded on a computer readable recording medium, such as a compact disc-ROM (CD-ROM), a CD-R, or a DVD, in an installable or executable file format.

The SB 904 is a bridge for connecting the NB 903 to a PCI device or a peripheral device. The ASIC 906 is an integrated circuit (IC) for image processing, which includes hardware components for image processing. The ASIC 906 functions as a bridge for connecting the AGP bus 921, a PCI bus 922, the HDD controller 908, and the MEM-C 907 to each other. The ASIC 906 includes a PCI target, an AGP master, an arbiter (ARB) forming a core of the ASIC 906, a memory controller for controlling the MEM-C 907, a plurality of direct memory access controllers (DMACs) that perform processes such as the rotation of image data with a hardware logic, and a PCI unit that transfers data to and from a scanner 931 or a printer 932 via the PCI bus 922. The ASIC 906 may be connected to an interface conforming to a standard such as USB or institute of electrical and electronics engineers (IEEE) 1394.

The MEM-C 907 is a local memory used as a copy image buffer and a code buffer. The HD 909 is a storage device for storing image data, font data for use in printing, and form data. The HDD controller 908 controls data writing and reading to and from the HD 909 under the control of the CPU 901. The AGP bus 921 is a bus interface for a graphics accelerator card proposed to speed up graphics processing. The AGP bus 921 enables the graphics accelerator card to directly access the MEM-P 902 with a high throughput, thereby implementing a high-speed graphics accelerator card.

The near field communication circuit 920 equipped with an antenna 920a is a communication circuit conforming to a standard such as near field communication (NFC) or Bluetooth (registered trademark).

The engine controller 930 includes the scanner 931 and the printer 932. The operation panel 940 includes a panel display 940a and an operation panel 940b. The panel display 940a is implemented by a touch panel, for example, to display the current setting values and a selection screen and receive an input from an operator (i.e., user). The operation panel 940b includes keys such as numeric keys for receiving the setting values of conditions related to image formation such as a density setting condition and a start key for receiving a copy start instruction. The controller 910 controls the entire information processing apparatus 3 to control rendering, communication, and input through the operation panel 940, for example. Each of the scanner 931 and the printer 932 includes an image processing device that performs processes such as error diffusion and gamma conversion.

With an application switch key included in the operation panel 940, the function of the information processing apparatus 3 is sequentially switched to a document box function, a copier function, a scanner function, a printer function, and a facsimile (FAX) function to select a desired function. When the document box function is selected, the information processing apparatus 3 is switched to a document box mode. When the copier function is selected, the information processing apparatus 3 is switched to a copy mode. When the scanner function is selected, the information processing apparatus 3 is switched to a scanner mode. When the printer function is selected, the information processing apparatus 3 is switched to a printer mode. When the FAX function is selected, the information processing apparatus 3 is switched to a FAX mode.

The network I/F 950 is an interface for performing data communication via a communication network. The near field communication circuit 920 and the network I/F 950 are electrically connected to the ASIC 906 via the PCI bus 922.

An example of the functional configuration of the information processing system 100 of the embodiment will be described with FIG. 5.

Figure 5:
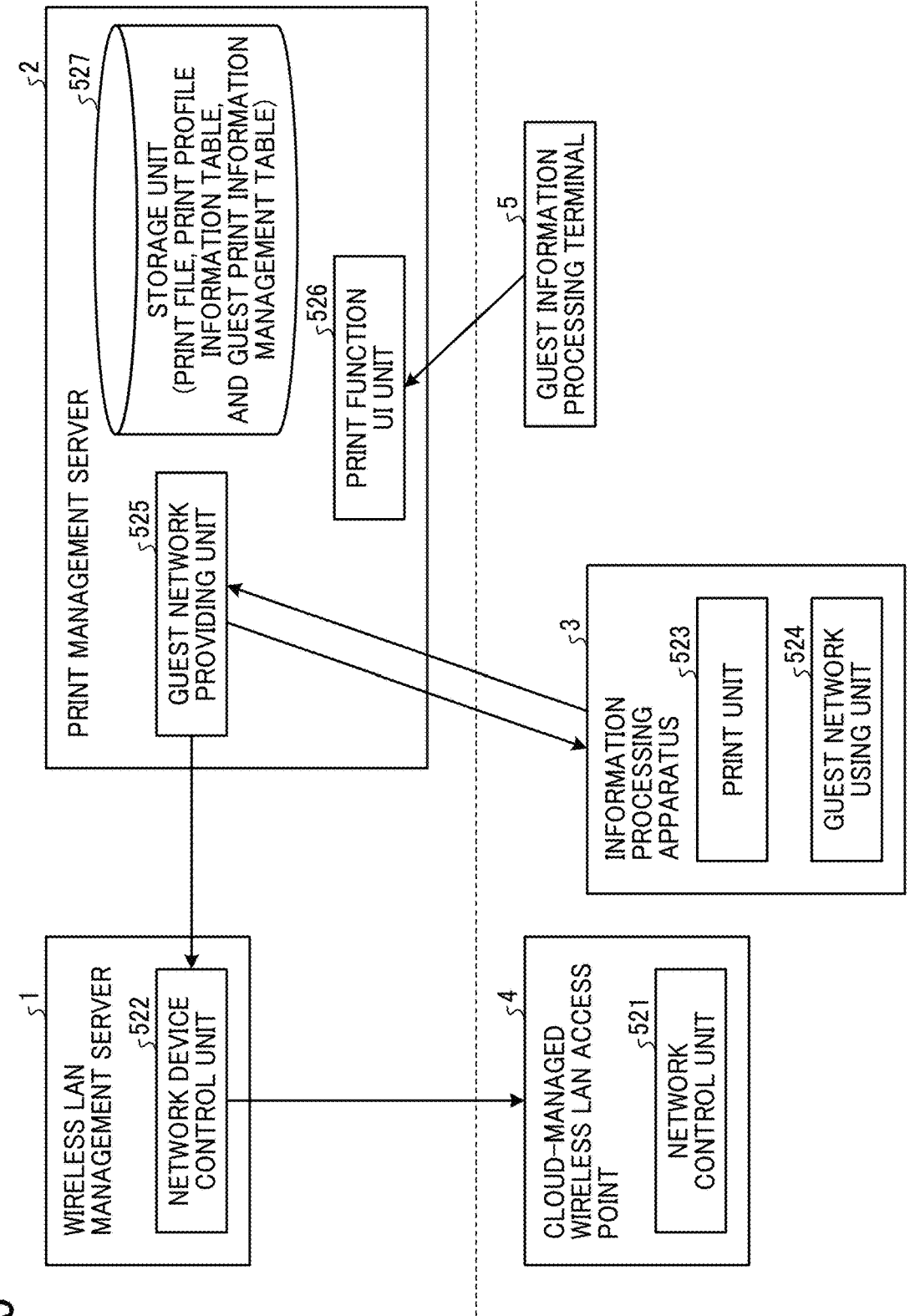
FIG. 5 is a block diagram illustrating an example of the functional configuration of the information processing system of the embodiment.

FIG. 5 is a block diagram illustrating an example of the functional configuration of the information processing system 100 of the embodiment.

As an example of the functional configuration of the cloud-managed wireless LAN access point 4, the cloud-managed wireless LAN access point 4 includes a network control unit 251. The network control unit 251 changes the settings for the communication between the wireless LAN management server 1, the print management server 2, the information processing apparatus 3, and the guest information processing terminal 5, for example.

As an example of the functional configuration of the wireless LAN management server 1, the wireless LAN management server 1 includes a network device control unit 522. In response to receipt of a request from the information processing apparatus 3 to enable or disable the guest network, the network device control unit 522 controls the cloud-managed wireless LAN access point 4 to enable or disable the guest network. Further, in response to receipt of a setting change command from the print management server 2, for example, the network device control unit 522 outputs a network setting change command to the cloud-managed wireless LAN access point 4. Thereby, the network device control unit 522 controls the access of the guest information processing terminal 5 to the guest network.

As an example of the functional configuration of the information processing apparatus 3, the information processing apparatus 3 includes a print unit 523 and a guest network using unit 524. In response to receipt of a use start request from the guest information processing terminal 5, the guest network using unit 524 requests the wireless LAN management server 1 to enable the guest network. The guest network using unit 524 further transmits the account creation request to the print management server 2. When transmitting the account creation request to the print management server 2, the guest network using unit 524 also transmits information such as the user ID, a password, the information processing apparatus ID, and the available print count to the print management server 2.

The guest network using unit 524 further receives authentication information from the guest information processing terminal 5. Herein, the authentication information is information for using the print function of the information processing apparatus 3. In the embodiment, the authentication information includes the user ID and the password, for example. Based on the received authentication information, the guest network using unit 524 executes an authentication process on the guest information processing terminal 5. Based on the user ID of the authenticated guest information processing terminal 5 and the information processing apparatus ID, the guest network using unit 524 acquires the guest account information and the print file corresponding to the guest account information from a later-described storage unit 527 of the print management server 2. Thereby, the printing of the print file is limited to the information processing apparatus 3 previously set with the information processing apparatus ID, consequently reducing the risk of leakage of various information stored in the storage unit 527 such as the guest account information and the print file. Herein, the print file is a file to be printed with an extension such as portable document format (PDF), joint photographic experts group (JPG), graphics interchange format (GIF), or portable network graphics (PNG), for example. Based on the result of executing the later-described print function of the print unit 523, the guest network using unit 524 updates the available print count included in the acquired guest account information, and transmits the updated available print count to the print management server 2.

If an instruction to disable the guest network is input to the information processing apparatus 3 from the guest information processing terminal 5, the guest network using unit 524 receives the authentication information from the guest information processing terminal 5. Then, based on the received authentication information, the guest network using unit 524 executes the authentication process on the guest information processing terminal 5. The guest network using unit 524 then transmits a delete instruction to the print management server 2 and requests the wireless LAN management server 1 to disable the guest network. Herein, the delete instruction is an instruction to delete the guest account information including the user ID of the authenticated guest information processing terminal 5 and the print file corresponding to the guest account information.

The guest network using unit 524 may further determine, at preset time intervals, whether the valid period of the guest network provided to the guest information processing terminal 5 has expired. Then, if the valid period has expired, the guest network using unit 524 may request the wireless LAN management server 1 to disable the guest network and may transmit the delete instruction to the print management server 2.

The print unit 523 controls the execution of the print function in accordance with the print file and the available print count included in the guest account information.

Thereby, the information processing apparatus 3 acquires the print file from the print management server 2 and executes the printing of the print file. Consequently, the guest information processing terminal 5 is able to use the information processing apparatus 3 (e.g., an MFP) in a facility via the print management server 2 (i.e., the print server), without using a driver.

As an example of the functional configuration of the print management server 2, the print management server 2 includes a guest network providing unit 525, a print function user interface (UI) unit 526, and the storage unit 527.

The storage unit 527 is an example of a memory that stores the print file, a print profile information table, and a guest print information management table, for example.

The guest print information management table is a table that stores the guest account information generated by the guest network providing unit 525 in accordance with the account creation request from the information processing apparatus 3. The guest print information management table is thus stored in the print management server 2. In the printing of the print file, therefore, the print management server 2 is able to identify the information processing apparatus 3 that has requested a print job. Consequently, the print file is prevented from being printed by an unintended information processing apparatus.

As illustrated in TABLE 1 given below, the guest account information stored in the guest print information management table of the embodiment includes information items such as user ID, status, available print count, and information processing apparatus ID.

TABLE 1

| USER ID | STATUS | AVAILABLE PRINT COUNT | INFORMATION PROCESSING APPARATUS ID |
|---|---|---|---|
| guest20201201 | ENABLED | 10 | T1 |
| guest20201202 | SUSPENDED | 20 | T2 |

Herein, the status is information indicating whether the print function is executable in the information processing apparatus 3. In the embodiment, the status represents one of three states: "enabled," "suspended," and "disabled." When the status is "enabled," the print function is executable in the information processing apparatus 3. When the status is "suspended," the print function is not being executed in the information processing apparatus 3. When the status is "disabled," the print function is inexecutable in the information processing apparatus 3.

The print profile information table is a table that stores setting information such as setting items and setting values in the printing of the print file with the print function of the information processing apparatus 3. As illustrated in TABLE 2 given below, the print profile information table of the embodiment stores information items such as print job ID, print file path, color settings, duplex, number of copies, print orientation, and sheet size.

TABLE 2

| PRINT JOB ID | PRINT FILE PATH | COLOR SETTINGS | DUPLEX | NUMBER OF COPIES | PRINT ORIENTATION | SHEET SIZE |
|---|---|---|---|---|---|---|
| P1 | /tmp/file2020051406121223.pdf | COLOR | 1 | 1 | PORTRAIT | A3 |
| P2 | /tmp/file2020051409340519.pdf | MONOCH ROME | 0 | 3 | LANDSCAPE | A4 |

The print function UI unit 526 receives the print file from the guest information processing terminal 5. The print function UI unit 526 then stores the received print file in the storage unit 527 in association with the guest account information of the guest information processing terminal 5, from which the print file has been transmitted.

The guest network providing unit 525 generates the guest account information in accordance with the account creation request from the information processing apparatus 3. The guest network providing unit 525 then stores the generated guest account information in the guest print information management table in the storage unit 527. Further, based on a print count (i.e., the number of prints made) received from the information processing apparatus 3, the guest network providing unit 525 updates the available print count included in the guest account information stored in the guest print information management table in the storage unit 527. It is thereby possible to limit the use of the print function of the information processing apparatus 3 even when the guest account information is stored in the storage unit 527 of the print management server 2, consequently preventing unlimited use of recording media such as paper and toner in the information processing apparatus 3.

Further, in accordance with the delete instruction from the information processing apparatus 3, the guest network providing unit 525 deletes the guest account information stored in the guest print information management table in the storage unit 527, and deletes the print file corresponding to the guest account information among one or more print files stored in the storage unit 527.

An example of a print setting screen displayed on the information processing apparatus 3 of the embodiment will be described with FIG. 6.

Figure 6:
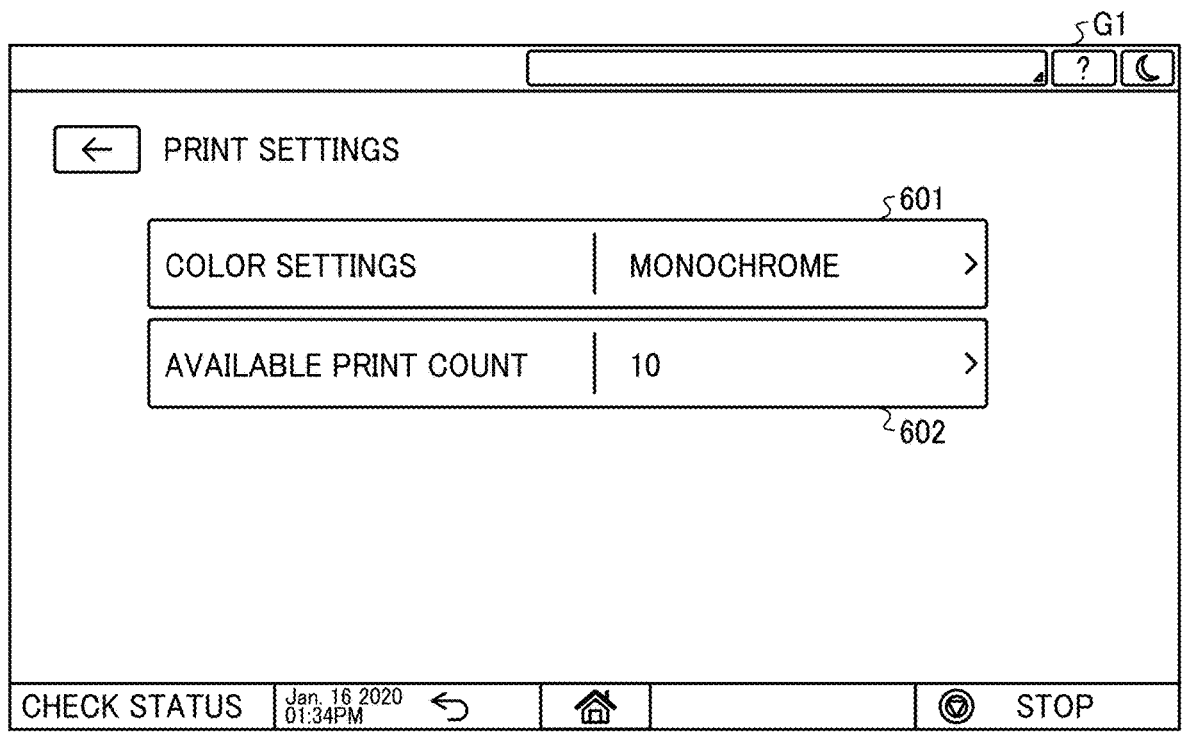
FIG. 6 is a diagram illustrating an example of a print setting screen displayed on the information processing apparatus of the embodiment.

FIG. 6 is a diagram illustrating an example of the print setting screen displayed on the information processing apparatus 3 of the embodiment. In the embodiment, in response to receipt of the use start request from the guest information processing terminal 5, the guest network using unit 524 of the information processing apparatus 3 displays a print setting screen G1 on a display of the information processing apparatus 3, as illustrated in FIG. 6. The print setting screen G1 is a screen on which the available print count is settable for each guest account information. In the embodiment, the print setting screen G1 includes a color setting input field 601 and an available print count input field 602, as illustrated in FIG. 6. When transmitting the account creation request to the print management server 2, the guest network using unit 524 transmits to the print management server 2 the color settings input to the color setting input field 601 and the available print count input to the available print count input field 602. Based on the available print count received from the information processing apparatus 3, the guest network providing unit 525 of the print management server 2 increases or reduces the available print count to be included in the guest account information.

An example of the procedure of a process of starting the use of the print function in the information processing system 100 of the embodiment will be described with FIG. 7.

Figure 7:
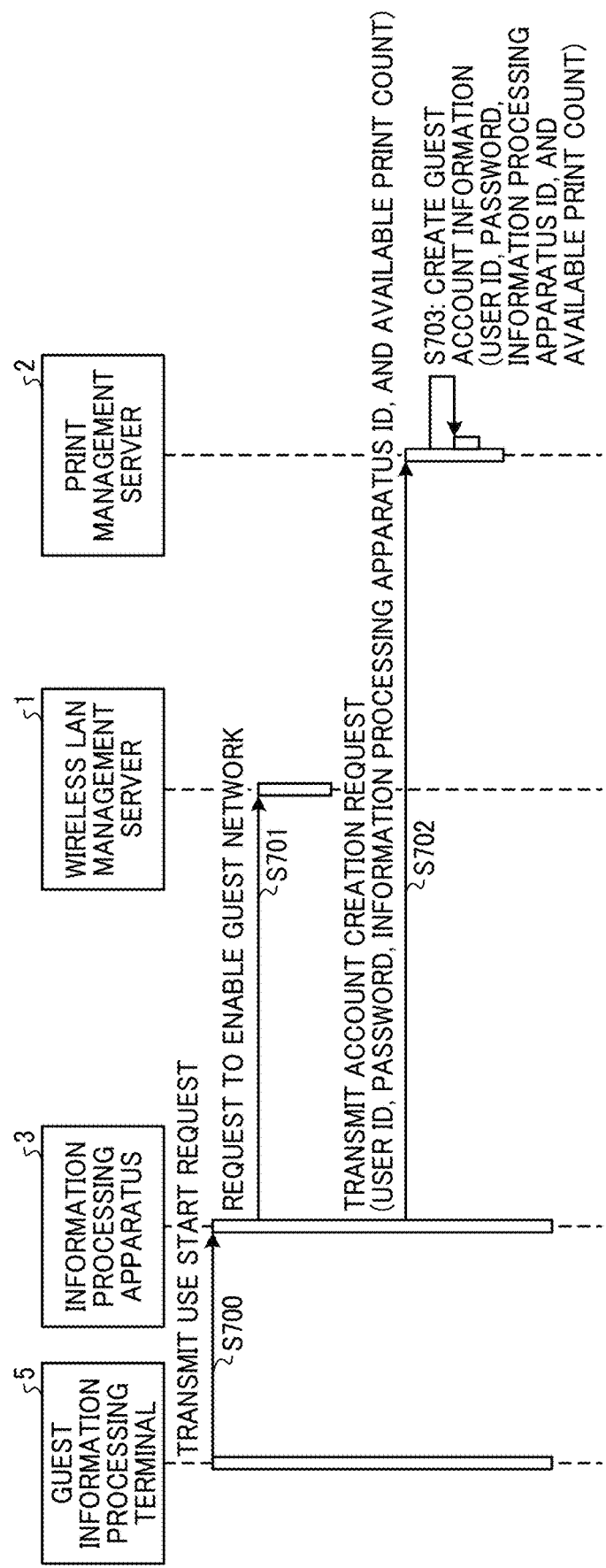
FIG. 7 is a sequence diagram illustrating an example of the procedure of a process of starting the use of a print function in the information processing system of the embodiment.

FIG. 7 is a sequence diagram illustrating an example of the procedure of the process of starting the use of the print function in the information processing system 100 of the embodiment.

In response to receipt of the use start request from the guest information processing terminal 5 (step S700), the guest network using unit 524 of the information processing apparatus 3 requests the wireless LAN management server 1 to enable the guest network (step S701). In response to receipt of the request to enable the guest network, the network device control unit 522 of the wireless LAN management server 1 enables the guest network.

The guest network using unit 524 further transmits the account creation request to the print management server 2 (step S702). In response to receipt of the account creation request from the information processing apparatus 3, the guest network providing unit 525 of the print management server 2 generates the guest account information (step S703), and stores the generated guest account information in the storage unit 527. Thereby, the guest information processing terminal 5 is able to print the print file with the print function of the information processing apparatus 3 via the print management server 2.

An example of a use start screen displayed during the process of starting the use of the print function in the information processing system 100 of the embodiment will be described with FIG. 8.

Figure 8:
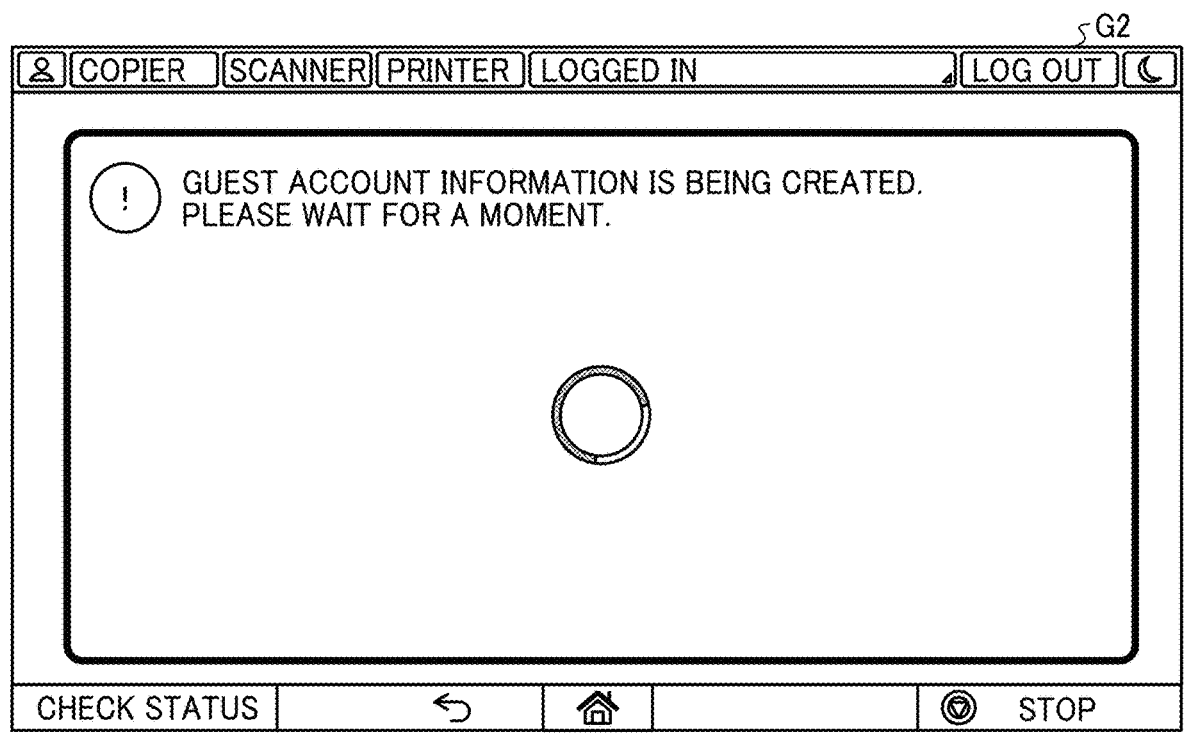
FIG. 8 is a diagram illustrating an example of a use start screen displayed during the process of starting the use of the print function in the information processing system of the embodiment.

FIG. 8 is a diagram illustrating an example of the use start screen displayed during the process of starting the use of the print function in the information processing system 100 of the embodiment. In the embodiment, during the execution of the process of starting the use of the print function in the information processing system 100, the guest network using unit 524 of the information processing apparatus 3 displays a use start screen G2 on the display of the information processing apparatus 3, as illustrated in FIG. 8. As illustrated in FIG. 8, the use start screen G2 is a screen for notifying that the guest account information is being created.

An example of a printed material printed in the execution of the process of starting the use of the print function in the information processing system 100 of the embodiment will be described with FIG. 9.

Figure 9:
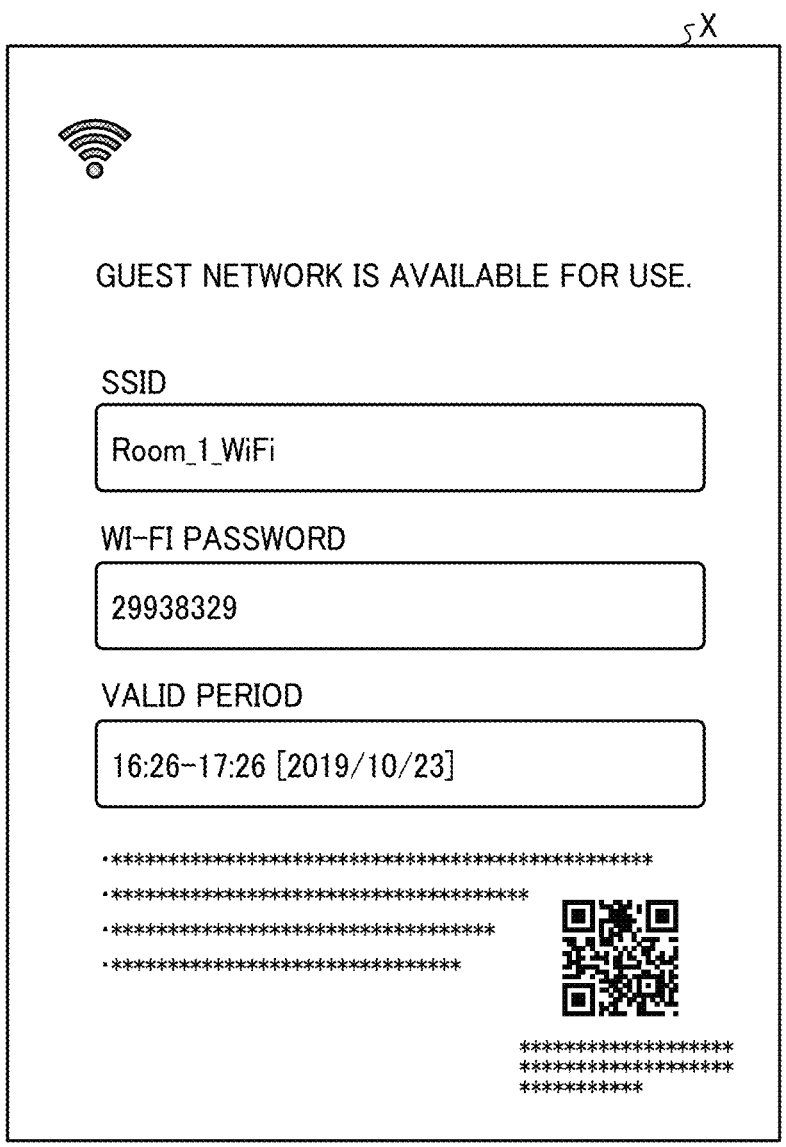
FIG. 9 is a diagram illustrating an example of a printed material printed in the execution of the process of starting the use of the print function in the information processing system of the embodiment.

FIG. 9 is a diagram illustrating an example of the printed material printed in the execution of the process of starting the use of the print function in the information processing system 100 of the embodiment. In the embodiment, when the print management server 2 has generated the guest account information, the print unit 523 of the information processing apparatus 3 executes the printing of a printed material X illustrated in FIG. 9. As illustrated in FIG. 9, a two-dimensional bar code representing the uniform resource locator (URL) for the guest information processing terminal 5 to communicate with the print management server 2, the service set identifier (SSID) of the cloud-managed wireless LAN access point 4, the password for using the guest network, and the valid period of the guest network, for example, are printed on the printed material X.

With the guest information processing terminal 5 transmitting the print file to the print management server 2 with the URL represented by the two-dimensional bar code printed on the printed material X, the print file is made printable. Further, with the guest information processing terminal 5 sharing the URL for connecting to the print management server 2 and the guest account information with the print management server 2 via a two-dimensional bar code reader or electronic mail, the printing process is relatively easily executed from the guest information processing terminal 5.

An example of the procedure of the printing process in the information processing system 100 of the embodiment will be described with FIG. 10.

Figure 10:
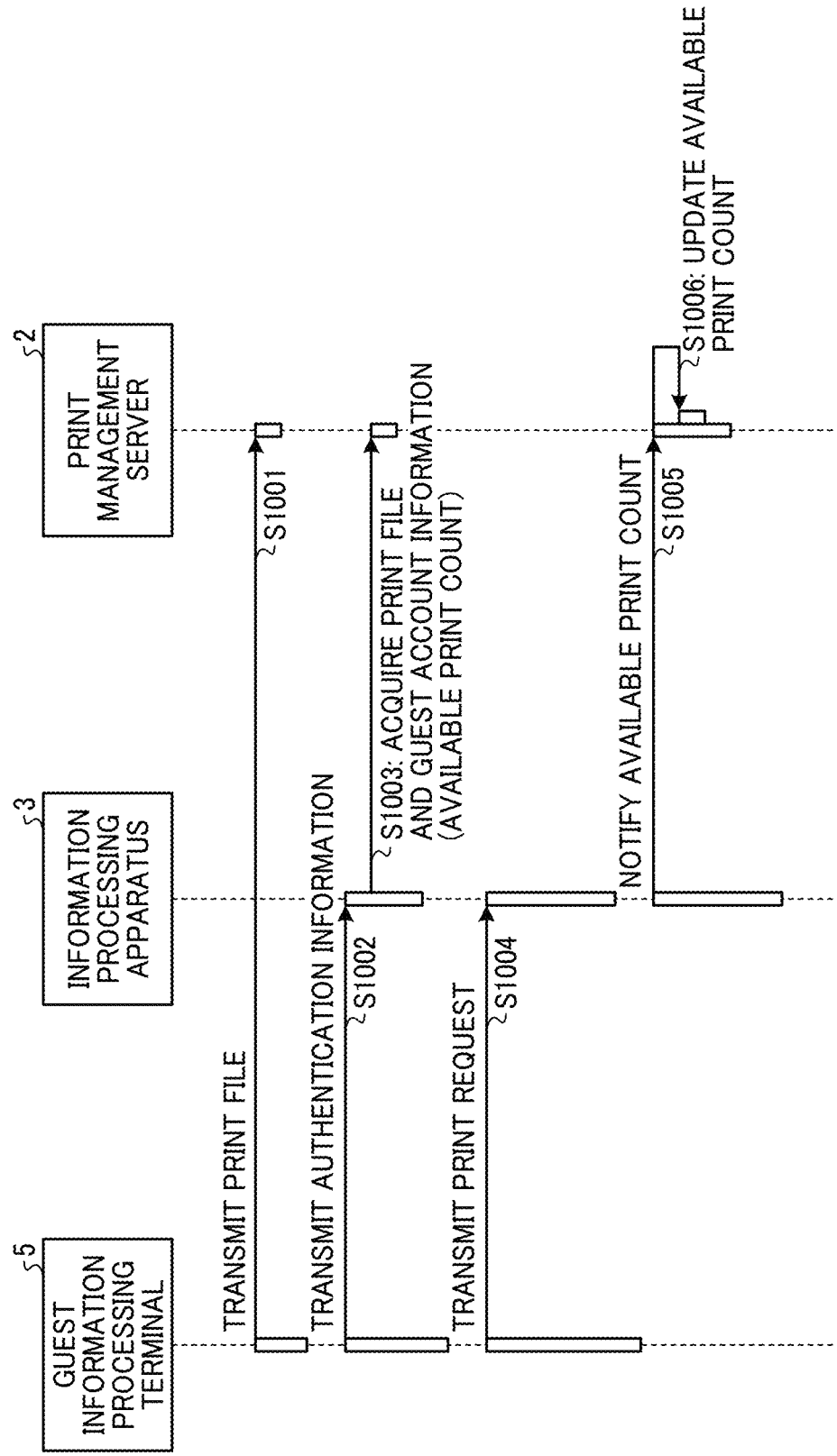
FIG. 10 is a sequence diagram illustrating an example of the procedure of a printing process in the information processing system of the embodiment.

FIG. 10 is a sequence diagram illustrating an example of the procedure of the printing process in the information processing system 100 of the embodiment.

The guest information processing terminal 5 first transmits the print file to the print management server 2 (step S1001). The guest information processing terminal 5 further transmits the authentication information to the information processing apparatus 3 (step S1002).

Based on the authentication information received from the guest information processing terminal 5, the guest network using unit 524 of the information processing apparatus 3 executes the authentication process on the guest information processing terminal 5. Then, based on the user ID of the authenticated guest information processing terminal 5 and the information processing apparatus ID, the guest network using unit 524 acquires the guest account information and the print file corresponding to the guest account information from the storage unit 527 of the print management server 2 (step S1003).

In response to receipt of a print request input from the guest information processing terminal 5 (step S1004), the print unit 523 of the information processing apparatus 3 selects the print file to be printed based on the guest account information and the print file, and executes the printing of the print file.

Then, based on the result of executing the print function, the guest network using unit 524 of the information processing apparatus 3 updates the available print count included in the guest account information, and notifies the print management server 2 of the updated available print count (step S1005).

Based on the available print count notified by the information processing apparatus 3, the guest network providing unit 525 of the print management server 2 updates the available print count included in the guest account information of the guest information processing terminal 5 having used the print function of the information processing apparatus 3 among one or more sets of guest account information stored in the storage unit 527 (step S1006).

An example of the procedure of a process of ending the use of the print function in the information processing system 100 of the embodiment will be described with FIG. 11.

Figure 11:
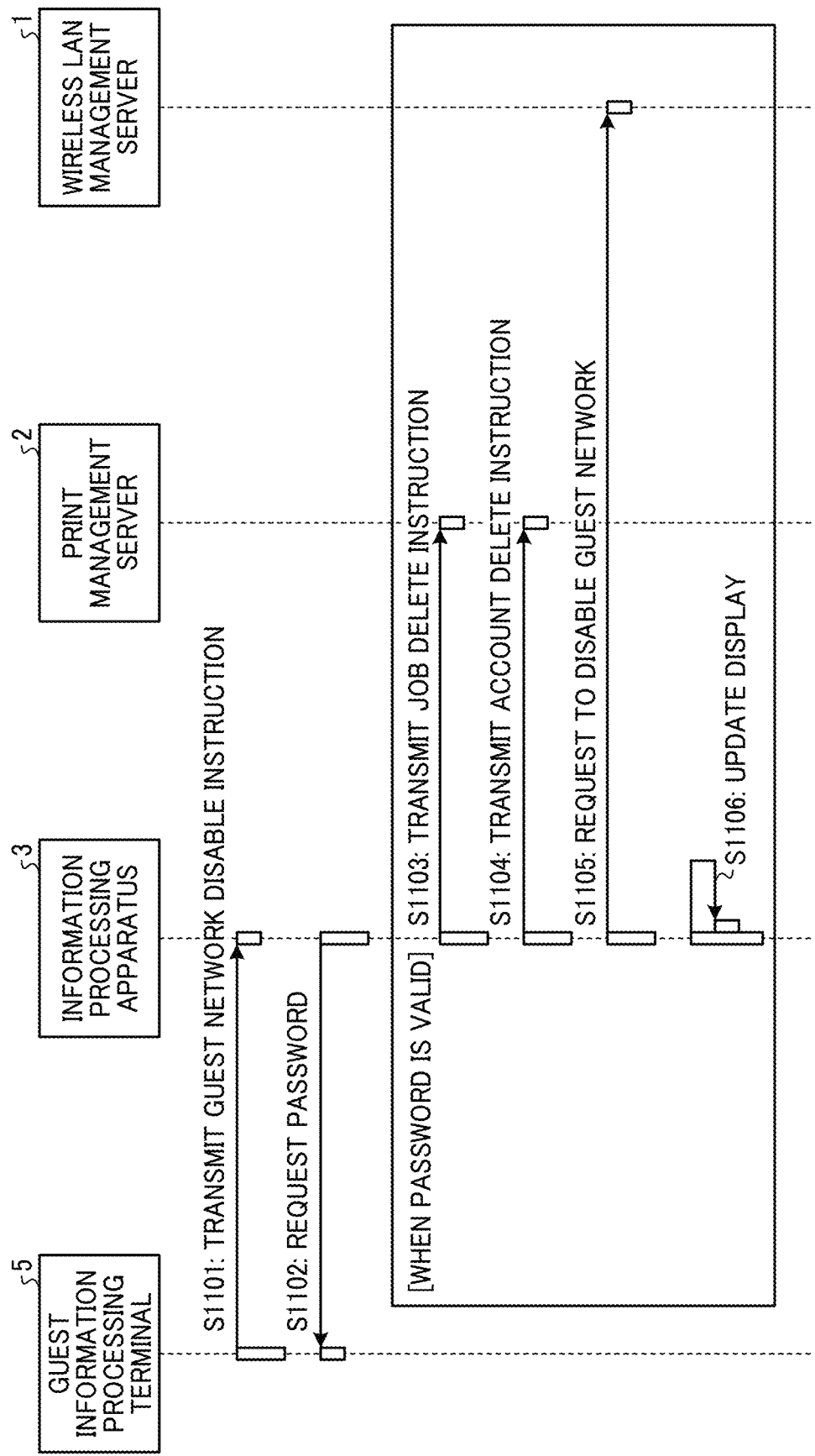
FIG. 11 is a sequence diagram illustrating an example of the procedure of a process of ending the use of the print function in the information processing system of the embodiment.

FIG. 11 is a sequence diagram illustrating an example of the procedure of the process of ending the use of the print function in the information processing system 100 of the embodiment.

When a guest network disable button of the guest information processing terminal 5 is pressed and a guest network disable instruction is input to the information processing apparatus 3 from the guest information processing terminal 5 (step S1101), the guest network using unit 524 of the information processing apparatus 3 requests the guest information processing terminal 5 to input the authentication information such as the password to the information processing apparatus 3 (step S1102). Then, based on the input authentication information such as the password, the guest network using unit 524 executes the authentication process on the guest information processing terminal 5.

The guest network using unit 524 then transmits to the print management server 2 a job delete instruction to delete the print file and an account delete instruction to delete the guest account information (steps S1103 and S1104). Then, the guest network providing unit 525 of the print management server 2 executes the deletion of the print file and the guest account information stored in the storage unit 527. Thereby, the print file and the guest account information stored in the print management server 2 are prevented from being leaked.

The guest network using unit 524 further requests the wireless LAN management server 1 to disable the guest network (step S1105). The network device control unit 522 of the wireless LAN management server 1 then disables the guest network.

Then, the guest network using unit 524 of the information processing apparatus 3 displays, on the display of the information processing apparatus 3, a use end screen for notifying that the guest network provided to the guest information processing terminal 5 has been disabled (step S1106).

An example of the use end screen displayed during the process of ending the use of the print function in the information processing system 100 of the embodiment will be described with FIG. 12.

Figure 12:
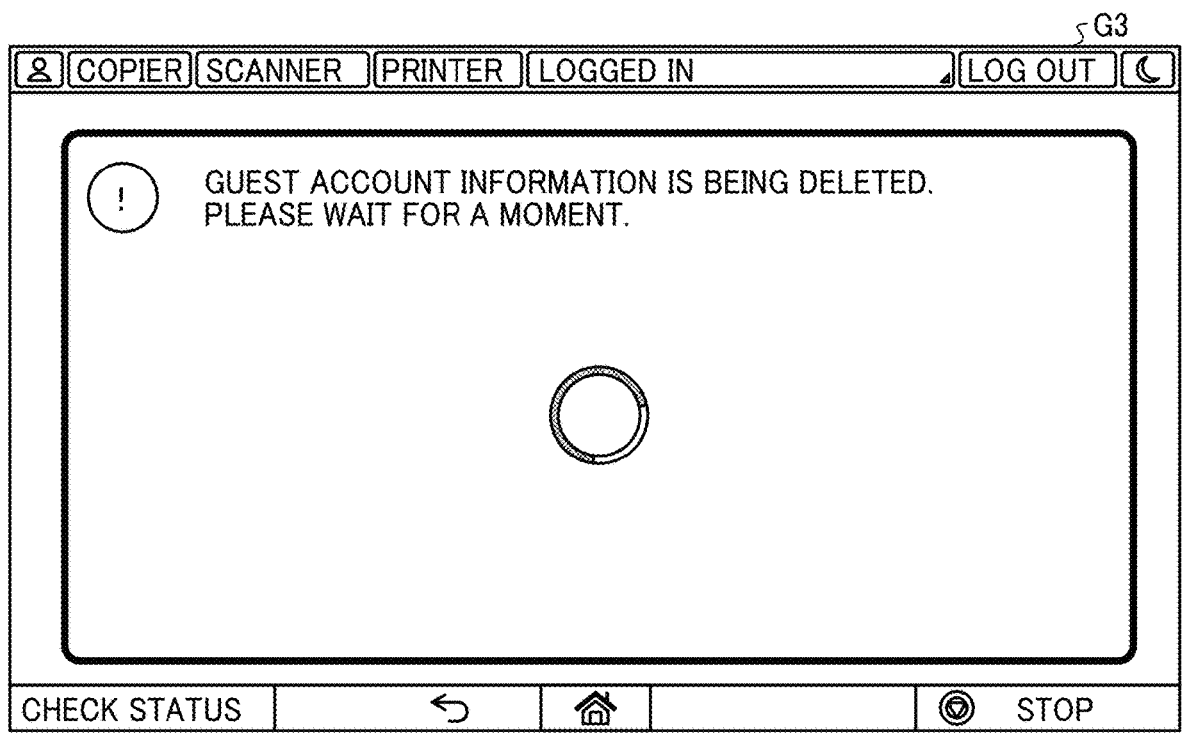
FIG. 12 is a diagram illustrating an example of a use end screen displayed during the process of ending the use of the print function in the information processing system of the embodiment.

FIG. 12 is a diagram illustrating an example of the use end screen displayed during the process of ending the use of the print function in the information processing system 100 of the embodiment. In the embodiment, during the execution of the process of ending the use of the print function in the information processing system 100, the guest network using unit 524 of the information processing apparatus 3 displays a use end screen G3 on the display of the information processing apparatus 3, as illustrated in FIG. 12. As illustrated in FIG. 12, the use end screen G3 is a screen for notifying that the guest account information is being deleted.

Another example of the procedure of the process of ending the use of the print function in the information processing system 100 of the embodiment will be described with FIG. 13.

Figure 13:
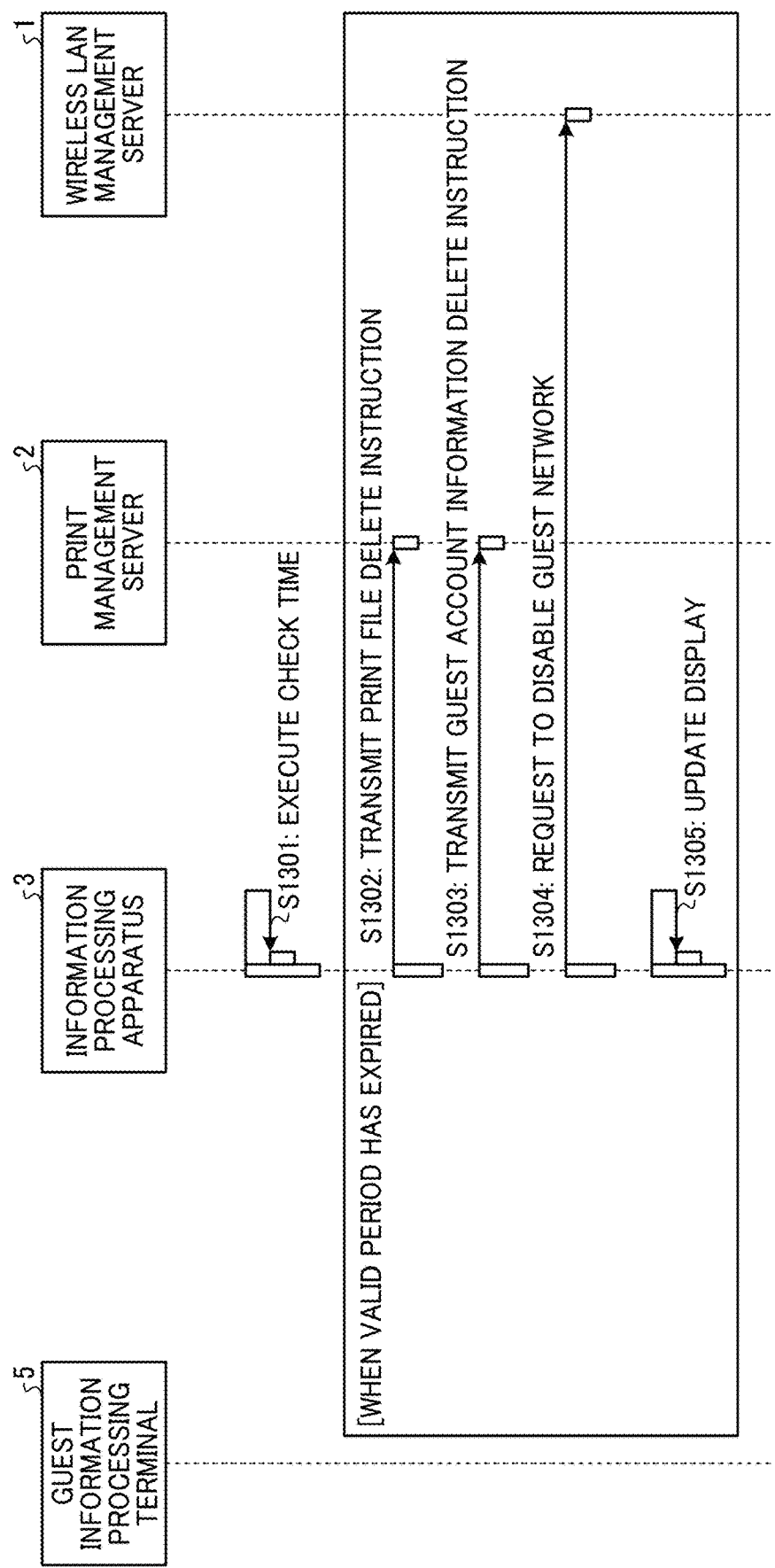
FIG. 13 is a sequence diagram illustrating another example of the procedure of the process of ending the use of the print function in the information processing system of the embodiment.

FIG. 13 is a sequence diagram illustrating another example of the procedure of the process of ending the use of the print function in the information processing system 100 of the embodiment.

After the process of starting the use of the print function of the information processing apparatus 3 is executed and the printing of the print file from the guest information processing terminal 5 becomes executable, the guest network using unit 524 of the information processing apparatus 3 executes time check at preset time intervals to determine whether the valid period of the guest network provided to the guest information processing terminal 5 has expired (step S1301).

If the valid period of the guest network provided to the guest information processing terminal 5 has expired, the guest network using unit 524 transmits the instruction to delete the print file and the instruction to delete the guest account information to the print management server 2 (steps S1302 and S1303). Then, the guest network providing unit 525 of the print management server 2 deletes the print file and the guest account information stored in the storage unit 527. Thereby, the print file and the guest account information stored in the print management server 2 are deleted without an instruction from the user of the guest information processing terminal 5 to delete the print file and the guest account information. Consequently, the leakage of the guest account information and the print file is prevented.

The guest network using unit 524 further requests the wireless LAN management server 1 to disable the guest network (step S1304). Then, the network device control unit 522 of the wireless LAN management server 1 disables the guest network. When the valid period of the guest network expires, therefore, the print function of the information processing apparatus 3 is automatically made unavailable for use, thereby reducing the load on an administrator of the information processing apparatus 3, who administers operations related to the guest network and the information processing apparatus 3.

Then, the guest network using unit 524 of the information processing apparatus 3 displays, on the display of the information processing apparatus 3, the use end screen for notifying that the guest network provided to the guest information processing terminal 5 has been disabled (step S1305).

Another example of the use end screen displayed during the process of ending the use of the print function in the information processing system 100 of the embodiment will be described with FIG. 14.

Figure 14:
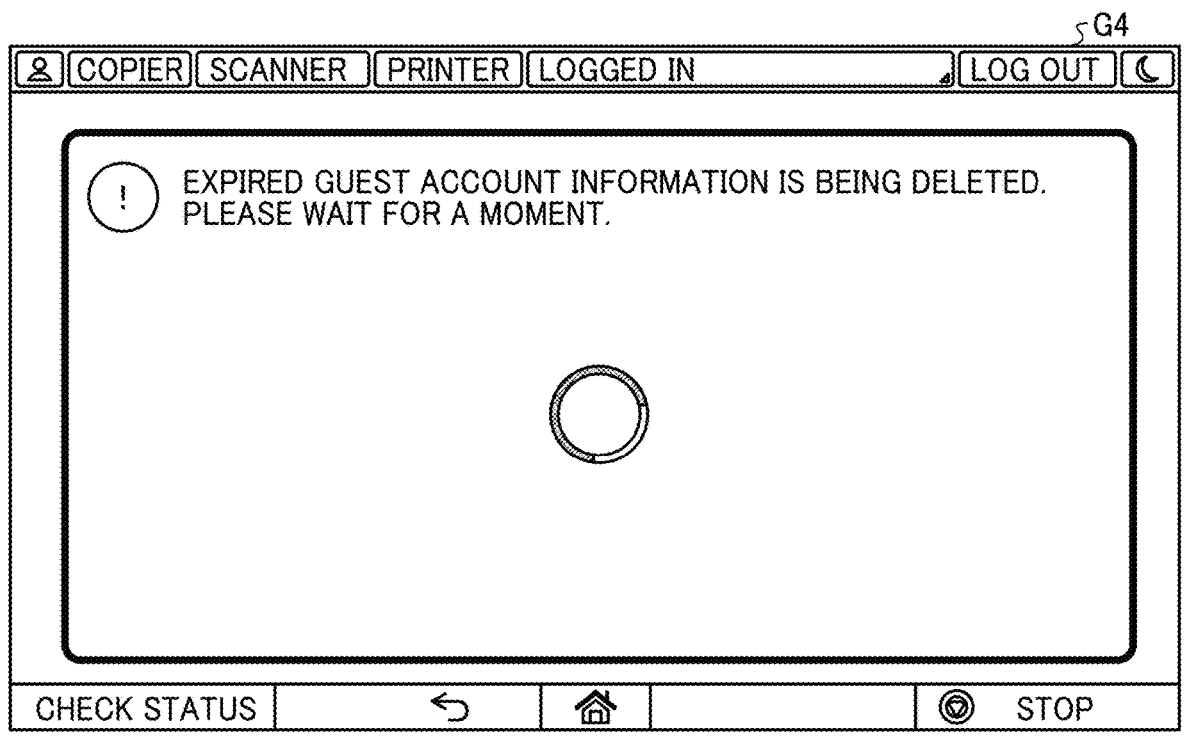
FIG. 14 is a diagram illustrating another example of the use end screen displayed during the process of ending the use of the print function in the information processing system of the embodiment.

FIG. 14 is a diagram illustrating another example of the use end screen displayed during the process of ending the use of the print function in the information processing system 100 of the embodiment. In the embodiment, when the valid period of the guest network provided to the guest information processing terminal 5 has expired and the process of ending the use of the print function in the information processing system 100 is being executed, the guest network using unit 524 of the information processing apparatus 3 displays a use end screen G4 on the display of the information processing apparatus 3, as illustrated in FIG. 14. As illustrated in FIG. 14, the use end screen G4 is a screen for notifying that the guest account information is being deleted with the expiration of the valid period of the guest network provided to the guest information processing terminal 5.

As described above, according to the information processing system 100 of the embodiment, the information processing apparatus 3 acquires the print file from the print management server 2 and executes the printing of the print file. Consequently, the guest information processing terminal 5 is able to use the information processing apparatus 3 (e.g., an MFP) in a facility, without using a driver.

Further, according to the information processing system 100 of the embodiment, the printing of the print file is limited to the information processing apparatus 3 previously set with the information processing apparatus ID, thereby reducing the risk of leakage of various information stored in the storage unit 527 of the print management server 2, such as the guest account information and the print file. Further, according to the information processing system 100 of the embodiment, it is possible to limit the use of the print function of the information processing apparatus 3 even when the guest account information is stored in the storage unit 527 of the print management server 2. Consequently, the unlimited use of recording media such as paper and toner in the information processing apparatus 3 is prevented.

Further, according to the information processing system 100 of the embodiment, when the valid period of the guest network expires, the guest network and the print function of the information processing apparatus 3 are automatically made unavailable for use, thereby reducing the load on the administrator of the information processing apparatus 3, who administers the operations related to the guest network and the information processing apparatus 3.

The apparatuses described in the embodiment form one of a plurality of computing environments for implementing the embodiment disclosed in the present specification. In an embodiment of the present invention, the print management server 2 is a server cluster including a plurality of computing devices configured to communicate with each other via a desired type of communication link such as a network or a shared memory, for example, to execute the processes disclosed in the present specification. Similarly, each of the wireless LAN management server 1 and the information processing apparatus 3 may include a plurality of computing devices configured to communicate with each other.

Further, the wireless LAN management server 1, the print management server 2, and the information processing apparatus 3 may be configured to share the disclosed process steps, such as those illustrated in FIG. 7, for example, in various combinations. For example, a process executed by the network device control unit 522 of the wireless LAN management server 1 may be executed by the print management server 2. Similarly, the functions of the guest network providing unit 525, the print function UI unit 526, and the storage unit 527 of the print management server 2 may be executed by the wireless LAN management server 1. Further, the components of the wireless LAN management server 1 and the components of the print management server 2 may be integrated in a single server, or may be distributed to a plurality of apparatuses.

In the above-described example of the embodiment, the information processing apparatus 3 is applied to the MFP equipped with at least two of the copier function, the printer function, the scanner function, and the FAX function. The information processing apparatus 3, however, is applicable to any image forming apparatus such as an MFP, a printer, a scanner, or a FAX machine, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:
1. An information processing system, comprising:
a printing apparatus; and
a print server including
first circuitry configured to:
generate guest account information in accordance with an account creation request from the printing apparatus, the guest account information including a user identifier for identifying a user of a guest information processing terminal, an available print count representing number of times allowed to execute printing with the printing apparatus, and an apparatus identifier for identifying the printing apparatus, and
receive a print file from the guest information processing terminal, and
a memory that stores the guest account information and the print file,
the printing apparatus including
second circuitry configured to:
receive, from the guest information processing terminal, authentication information for executing the printing,
acquire the guest account information and the print file corresponding to the guest account information from the print server based on the apparatus identifier and the user identifier of the user of the guest information processing terminal authenticated with the authentication information,
control execution of the printing in accordance with the acquired print file, and
update the available print count in the acquired guest account information based on a result of executing the printing, and transmit the updated available print count to the print server,
wherein the first circuitry of the print server is further configured to, based on the updated available print count received from the printing apparatus, update the available print count in the guest account information of the guest information processing terminal having executed the printing among one or more sets of guest account information stored in the memory.

2. The information processing system of claim 1, further comprising;
a wireless communication management server including third circuitry, the third circuitry being configured to enable or disable a guest network for connecting the guest information processing terminal, the printing apparatus, and the print server to each other,
wherein, in response to receipt of a disable instruction input to the printing apparatus to disable the guest network, the second circuitry of the printing apparatus:
transmits a delete instruction to the print server to delete:
the guest account information including the user identifier of the user of the guest information processing terminal authenticated with the authentication information received from the guest information processing terminal, and
the print file corresponding to the guest account information, and requests the wireless communication management server to disable the guest network.

3. The information processing system of claim 2, wherein the second circuitry of the printing apparatus is further configured to:
determine, at preset time intervals, whether a valid period of the guest network has expired, and
based on a determination that the valid period of the guest network has expired, transmit the delete instruction to the print server and requests the wireless communication management server to disable the guest network.

4. A server, comprising:
circuitry configured to:
generate guest account information in accordance with an account creation request from a printing apparatus, the guest account information including a user identifier for identifying a user of a guest information processing terminal, an available print count representing number of times allowed to execute printing with the printing apparatus, and an apparatus identifier for identifying the printing apparatus, and
receive a print file from the guest information processing terminal, and a memory that stores the guest account information and the print file, the circuitry being further configured to:

acquire the guest account information and the print file corresponding to the guest account information from the memory based on the apparatus identifier and the user identifier of the user of the guest information processing terminal, the apparatus identifier and the user identifier having been received from the printing apparatus, transmit the acquired print file to the printing apparatus, receive an updated available print count from the printing apparatus, the updated available print count resulting from updating the available print count based on a result of executing the printing, and based on the updated available print count received from the printing apparatus, update the available print count in the guest account information of the guest information processing terminal having executed the printing among one or more sets of guest account information stored in the memory.

5. The server of claim 4, further comprising;

another circuitry configured to enable or disable a guest network for connecting the guest information processing terminal and the printing apparatus to each other, wherein the another circuitry is further configured to receive from the printing apparatus a delete instruction, the delete instruction being transmitted in receipt of a disable instruction input to the printing apparatus to disable the guest network, the delete instruction being configured to delete the guest account information including the user identifier of the user of the guest information processing terminal authenticated with authentication information received from the guest information processing terminal, and the print file corresponding to the guest account information, and the another circuitry is further configured to receive a request to disable the guest network.

6. The server of claim 5, wherein:

the delete instruction is received from the printing apparatus based on a determination by the printing apparatus that a valid period of the guest network has expired.

7. An information processing method comprising:

generating guest account information in accordance with an account creation request from a printing apparatus, the guest account information including a user identifier for identifying a user of a guest information processing terminal, an available print count representing number of times allowed to execute printing with the printing apparatus, and an apparatus identifier for identifying the printing apparatus;

receiving a print file from the guest information processing terminal;

storing the guest account information and the print file in a memory;

acquiring the guest account information and the print file corresponding to the guest account information from the memory based on the apparatus identifier and the user identifier of the user of the guest information processing terminal, the apparatus identifier and the user identifier having been received from the printing apparatus;

transmitting the acquired print file to the printing apparatus;

receiving an updated available print count from the printing apparatus, the updated available print count resulting from updating the available print count based on a result of executing the printing; and based on the updated available print count received from the printing apparatus, updating the available print count in the guest account information of the guest information processing terminal having executed the printing among one or more sets of guest account information stored in the memory.

* * * * *